US006820913B2

(12) United States Patent
Macey et al.

(10) Patent No.: US 6,820,913 B2
(45) Date of Patent: Nov. 23, 2004

(54) CONVERTIBLE SEAT ASSEMBLY WITH CROSS-VEHICLE SUPPORT

(75) Inventors: Stuart P Macey, Carlsbad, CA (US); Micheal R Castiglione, Carlsbad, CA (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/393,207

(22) Filed: Mar. 20, 2003

(65) Prior Publication Data

US 2004/0183329 A1 Sep. 23, 2004

(51) Int. Cl.[7] .............................. B60N 2/07; B60N 2/12
(52) U.S. Cl. ............................. 296/65.13; 296/65.01; 296/67
(58) Field of Search ....................... 296/65.01, 65.13, 296/65.14, 66, 67, 69, 68.1; 297/15

(56) References Cited

U.S. PATENT DOCUMENTS

| | | | | |
|---|---|---|---|---|
| 3,944,276 A | * | 3/1976 | de Rosa et al. | 296/65.13 |
| 4,512,604 A | * | 4/1985 | Maeda et al. | 296/68.1 |
| 5,435,618 A | * | 7/1995 | Sacco et al. | 296/187.12 |
| 5,868,451 A | * | 2/1999 | Uno et al. | 296/66 |
| 5,890,758 A | * | 4/1999 | Pone et al. | 297/15 |
| 5,975,612 A | * | 11/1999 | Macey et al. | 296/66 |
| 5,979,964 A | * | 11/1999 | Ban et al. | 296/66 |
| 6,053,555 A | * | 4/2000 | Neale | 296/65.03 |
| 6,234,553 B1 | * | 5/2001 | Eschelbach et al. | 296/65.14 |
| 6,270,140 B1 | * | 8/2001 | Opfer et al. | 296/65.03 |
| 6,435,589 B2 | | 8/2002 | Shimizu et al. | |
| 6,499,787 B2 | | 12/2002 | Jach et al. | |
| 2002/0047287 A1 | * | 4/2002 | Kawasaki | 296/64 |

FOREIGN PATENT DOCUMENTS

FR    2536349 A1 *  5/1984  ............ 297/15

* cited by examiner

Primary Examiner—D. Glenn Dayoan
Assistant Examiner—Greg Blankenship
(74) Attorney, Agent, or Firm—Ralph E. Smith

(57) ABSTRACT

A vehicle seat having a support structure adapted to rigidly support the seat in multiple use positions and to guide the seat into a storage position for minimizing the volume of vehicle interior occupied by the seat. The vehicle seat and support mechanism are adapted to be stored in a recessed compartment of the vehicle. The support mechanism includes a frame spanning the vehicle interior with cross-vehicle members and engaging a track on the sidewall of the vehicle, eliminating the need for under-seat support connected to the vehicle floor, and providing cross-vehicle bracing to increase rigidity and minimize intrusion into the vehicle interior in the case of a side impact.

6 Claims, 4 Drawing Sheets

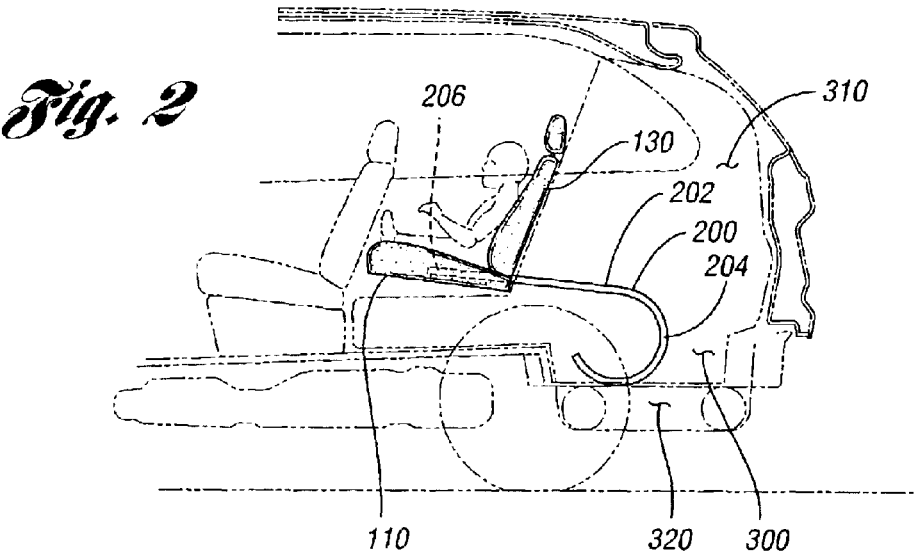
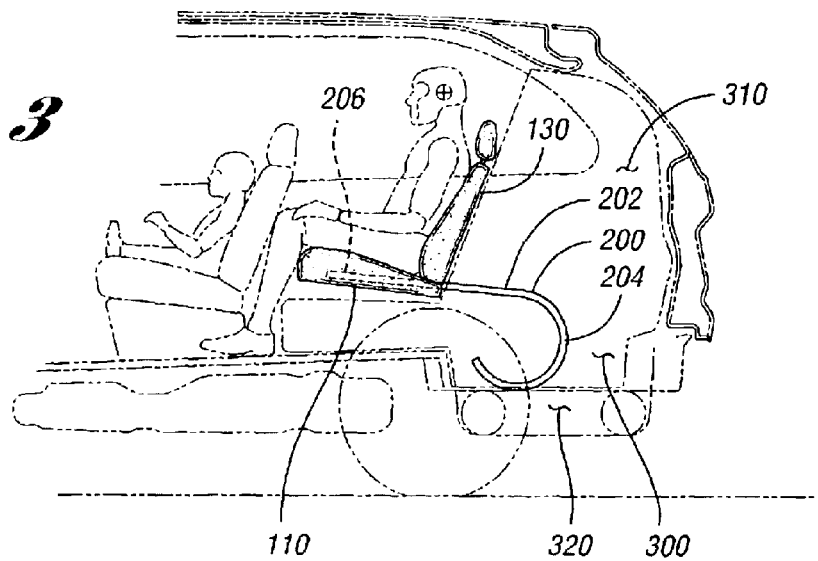

CONVERTIBLE SEAT ASSEMBLY WITH CROSS-VEHICLE SUPPORT

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The present invention relates generally to a vehicle seating system. In one of its aspects, the invention relates to folding vehicle seats. In another of its aspects, the invention relates to vehicle seats collapsible into a compartment within the vehicle.

2. Description of Related Art

Vans and other multi-use vehicles are used to carry a number of passengers. It is also desirable to be able to use the interior volume of the vehicle to carry cargo from time to time. While the vehicle is carrying passengers, each passenger must have a seat that is secured within the vehicle, and include proper passenger restraints. These seats take up interior volume that is not usable for cargo when the vehicle is in cargo-carrying mode. This issue is conventionally addressed in several ways.

A first manner of addressing this issue is to provide folding seatbacks. The seatbacks are pivotally mounted to the seat base, and are adapted to lay flat over the seat base, or to lay back so as to be parallel with the seat base, forming a flat support surface. Either of these methods provides a reasonably contiguous volume within the vehicle, but that volume might only be one-half of the total interior volume.

A second manner of freeing up the interior volume of the vehicle is to remove the seats in their entirety. This well-known method generally involves detaching the seat support from an anchoring feature set into the floor of the vehicle interior. The released seat must then be maneuvered through a vehicle door and stored somewhere outside the vehicle; the seat is thus not available for use again until the vehicle returns to the seat storage site.

A third manner of increasing the available vehicle cargo volume involves folding the seats into an in-floor or under-floor recess or cavity. Various examples of this practice are known, and generally require that the seats be mounted to the vehicle load floor in a substantially fixed position so that the seats can generally pivot into the provided storage receptacle.

It would be advantageous to provide a seat mechanism that is adapted to move the seat out of the way, to maximize interior storage volume of the interior of the vehicle, without requiring removal and storage of the seat outside of the vehicle, and further to provide such a seat that is adjustable in position and orientation while in use.

BRIEF SUMMARY OF THE INVENTION

A seat assembly mounted on a cross-vehicle frame, the frame including a member riding in a channel proximate the vehicle sidewall to provide adjustability of the position of the seat assembly, longitudinal and vertical movement of the seat assembly and cross-vehicle reinforcement to control side intrusion during impact.

BRIEF DESCRIPTION OF THE SEVERAL VIEWS OF THE DRAWINGS

The present invention will become more fully understood from the detailed description and the accompanying drawings, wherein:

FIG. 2 is a side view of the seat assembly of FIG. 1 in a first use position.

FIG. 3 is a side view of the seat assembly of FIG. 1 in a second use position.

DETAILED DESCRIPTION OF THE INVENTION

Figure 1:
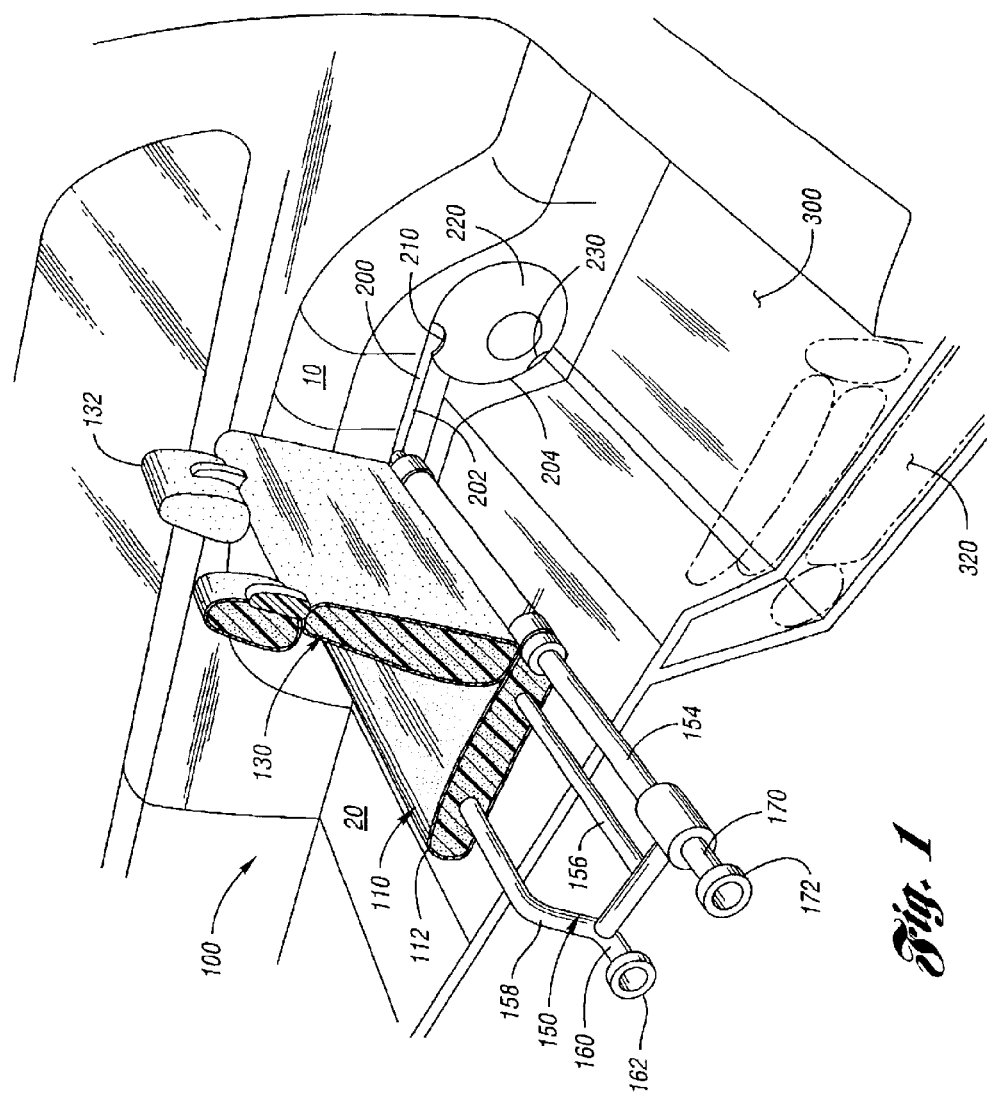
FIG. 1 is a partial cut-away perspective view of a convertible seat assembly with cross-vehicle support according to the invention.

Referring to FIG. 1, a convertible seat assembly 100 according to the invention includes a seat base 110, a seat back 130, a seat frame 150, and tracks 200. Generally, the seat back 130 is pivotally mounted to a rear portion of the seat base 110, and the seat base 110 is supported by the seat frame 150, which engages tracks 200.

Seat base 110 is formed of a seat cushion portion 112 affixed to seat frame 150 for supporting the weight of a user. As shown in FIG. 1, the scat frame 150 comprises a number of parallel cross-members 154, 156, 158 integrally connected with the seat base 110. A pair of seat frame supports 160, 170 extend outwardly from the seat frame 150. A roller 162, 172 is rotatably attached at the end of each seat frame support 160, 170.

The seat assembly 100 is supported by the seat frame supports 160, 170. The supports 160, 170 each have a roller 162, 172 that rides in tracks 200 recessed behind each sidewall trim panel 10 of the vehicle. The tracks 200 are parallel and are rigidly attached to each structural sidewall (not shown) of the vehicle. Tracks 200 are adapted with rollers 162, 172 to maintain alignment of seat frame 150 perpendicular to the tracks 200, to prevent racking of the seat frame 150 or binding of the rollers 162, 172 in tracks 200. Rollers 162, 172 must generally travel at the same rate in each of the tracks 200.

Tracks 200 are accessible through a slot 202 in each sidewall trim panel 10. Slots 202 are of sufficient width to allow unimpeded passage of the seat frame supports 160, 170, but are generally narrower than the rollers 162, 172 to prevent insertion of items, or fingers between the rollers 162, 172 and the track 200.

The tracks 200 have a forward straight portion 206 and a rearward arcuate portion 204. The arcuate portion 204 is covered by a carousel 220. The carousel 220 completely covers the arcuate portion 204 except for two notches 210, 230 on the perimeter of the carousel over the arcuate portion 204. Notches 210, 230 are placed on the carousel perimeter to define a chord length equal to the spacing of seat frame supports 160, 170. In this way, the rollers 162, 172 will engage the arcuate portion 204 as carousel 220 rotates to align notches 210, 230 with seat frame supports 160, 170.

Arcuate portion 204 remains otherwise covered by the carousel 220. The carousel 220 rotates about a central axis so that the notches 210, 230 remain aligned with seat frame supports 160, 170 without hindering movement of the seat assembly 100. The rollers 162, 172 continue along the arcuate portion 204 of the track 200 as the seat assembly 100 is moved rearward in the vehicle.

With reference now to FIGS. 2–7, the convertible seat assembly 100 according to the invention is shown in multiple positions along the tracks 200. In a preferred embodiment, the scat assembly 100 is infinitely adjustable, capable of being secured in any position along the length of tracks 200. For example, FIG. 2 shows the seat assembly 100 in a forwardmost position, substantially eliminating any passenger leg room while putting a child seat in a more accessible placement, and maximizing the available cargo room 310 behind and underneath the seat assembly 100.

Figure 4:
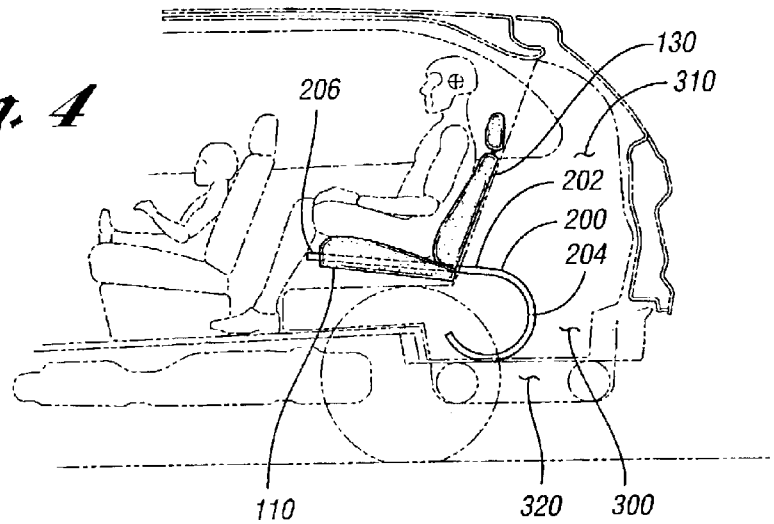
FIG. 4 is a side view of the seat assembly of FIG. 1 in a third use position.
Figure 5:
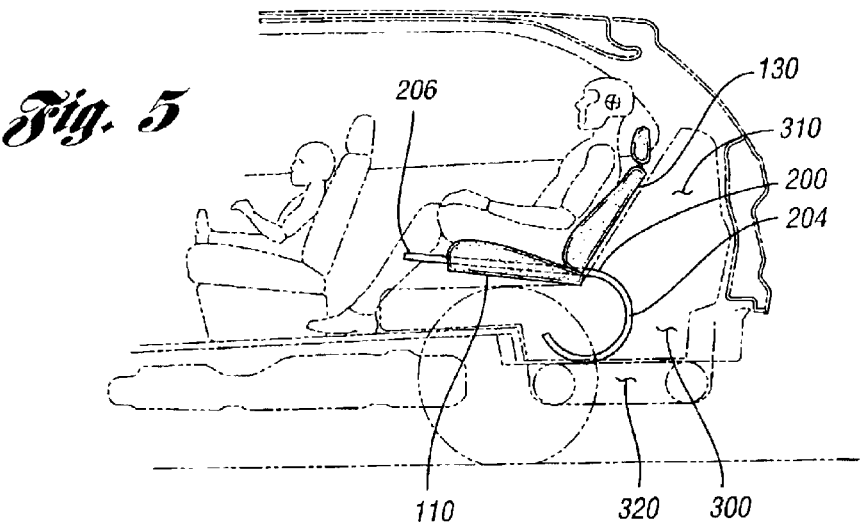
FIG. 5 is a side view of the seat assembly of FIG. 1 in a fourth use position.

FIGS. 3–5 depict the seat assembly 100 in progressively further rearward positions, affording increasing legroom to the seated passenger while decreasing the cargo room 310 available behind the seat assembly 100. As shown in FIGS. 2-5, by supporting the seat assembly 100 from the sides of the vehicle interior, thus obviating the need for seat risers mounted to the load floor 20, the space underneath the seat assembly 100 is available for cargo. The seat frame 150 further serves the desirable purpose of providing cross-vehicle support. Cross members 154, 156, 158 provide structural reinforcement between the structural sidewalls (not shown) of the vehicle, adding cross-vehicle rigidity and resistance to intrusion from side impacts, particularly due to their position above the load floor 20 while in use.

Figure 6:
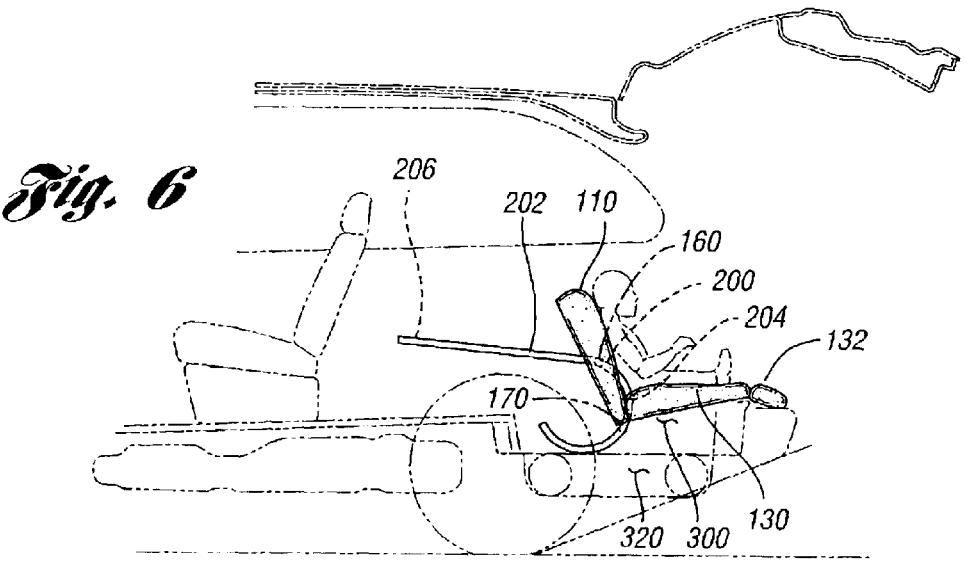
FIG. 6 is a side view of the seat assembly of FIG. 1 in a fifth use position.

Referring now to FIG. 6, the seat frame supports 160, 170 are in the notches 210, 230 (not shown) of the carousel 220 and the rollers 162, 172 have engaged the arcuate portion 204 of tracks 200. As the rollers 162, 172 travel in the arcuate portion 204 of tracks 200, seat frame 150 will begin to rotate about the center of the arcuate portion 204. As shown in FIG. 6, the tailgate of the vehicle can be opened and the seat back 130 can be allowed to rotate with the seat frame 150 until the seat back 130 is supported by the bottom of the tailgate opening. With the seat assembly 100 in this position, seat frame 150 can be locked in place in tracks 200 to provide a "tailgater" seating position, the seat back 130 now supporting the weight of a user and the seat base 110 serving as a backrest.

As the seat assembly 100 is rotated further rearward, rollers 162, 172 continue to travel in arcuate portion 204 of tracks 200. For seat assembly 100 to rotate further rearward than the position shown in FIG. 6, it will become necessary to pivot seat back 130 toward seat base 110, effectively folding seat assembly 100. Head rest 132 is pivotally mounted to seat back 130, so that with seat back 130 folded flat against seat base 110, head rest 132 can pivot flat against the leading edge of seat base 110 and the top edge of seat back 130 to minimize the package space occupied by the folded seat assembly 100. This folded arrangement is shown in FIG. 7.

Figure 7:
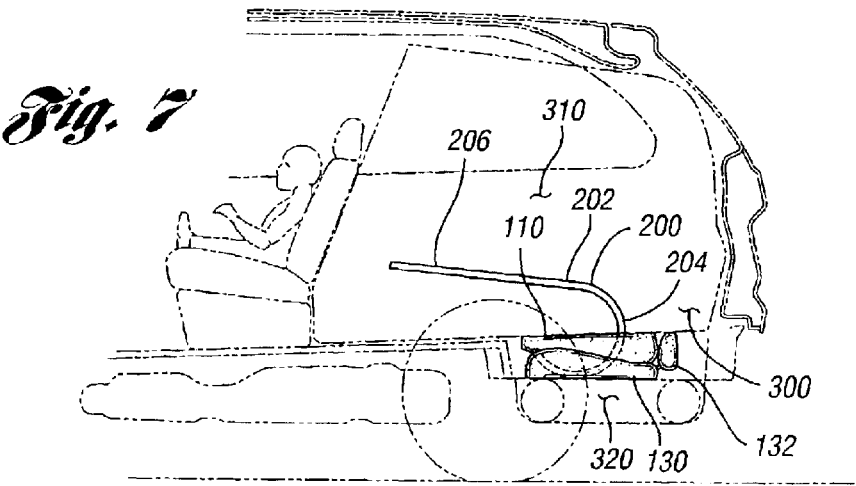
FIG. 7 is a side view of the seat assembly of FIG. 1 in a storage position.

FIG. 7 depicts the stored position of the seat assembly 100. The seat back 130 has been pivoted flat against seat base 110 and head rest 132 has been pivoted against the leading edge of seat base 110 to minimize the package space of the folded seat assembly 100. The seat assembly 100 has been rotated substantially 180 degrees from its use position as the rollers 162, 172 continue to traverse the arcuate portion 204 of the tracks 200. As the seat assembly 100 completes its full rotation, it enters a seat storage cavity or recess 300. Recess 300 can be equipped with a cover (not shown) or can constitute a portion of the cargo room 310 when the seat assembly 100 is in a use position. Beneath the recess 300 is a spare tire storage cavity 320.

As shown in FIG. 7, with the seat assembly 100 folded into recess 300, the underside of seat base 110 forms a substantially continuous surface with the load floor 20 of the vehicle, maximizing the volume of cargo room 310. A cover (not shown) for recess 300 would also provide a continuous floor surface.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the scope of the appended claims.

What is claimed is:

1. A seat assembly for a motor vehicle having opposing sidewall structures and a rearwardly located storage recess, the seat assembly comprising:

a retractable seat having a generally horizontal member and a generally upright seatback member pivotally attached thereto, the retractable seat being movable between an operative condition and a stored condition;

a seat support frame spanning an interior of the motor vehicle between the sidewall structures;

guide tracks mounted to each of the opposing sidewall structures to interconnect the seat support frame and the sidewall structures, the guide tracks including a horizontal section and an arcuate section; and a frame support extending from the seat support frame to each of the guide tracks and including a roller mechanism to permit movement along the guide tracks;

whereby the retractable seat in the operative condition is adjustable along the horizontal section of the guide tracks in a fore and aft manner, and movable on the arcuate section to a stored condition in the rearwardly located storage recess.

2. A convertible seat assembly for a vehicle, the seat assembly comprising:

a seat base and a seat back pivotable relative to the seat base, the seat base including a seat frame adapted to span an interior width of the vehicle, the seat frame comprising frame supports extending outwardly to each side of the seat frame, and at least one frame member rigidly connecting the frame supports and further comprising rollers rotationally mounted on the frame supports; and tracks adapted to mount proximate interior sidewalls of the vehicle and including a horizontal portion that extends longitudinally along the vehicle sidewalls above a vehicle load floor and an arcuate portion, so as to provide cross-vehicle reinforcing between vehicle sidewalls, and wherein the rollers engage the tracks to movably support the seat frame above the vehicle load floor, and wherein the seat base is horizontally adjustable with the rollers engaging the horizontal portion of the tracks, and wherein the seat base rotates to a storage position as the rollers traverse the arcuate portion.

3. The seat assembly of claim 2, further comprising a recess for receiving the seat base and seat back in the storage position.

4. A convertible seat assembly for a vehicle, the seat assembly comprising:

a seat base and a seat back pivotable relative to the seat base, the seat base including a seat frame adapted to span an interior width of the vehicle, the seat frame comprising a pair of frame supports extending outwardly to each of a left side and a right side of the seat frame, and at least one frame member rigidly connecting the frame supports; and tracks adapted to mount proximate interior sidewalls of the vehicle and including a horizontal portion that extends longitudinally along the vehicle sidewalls above a vehicle load floor, wherein the frame supports are adapted to engage the tracks to support the seat frame so as to provide cross-vehicle reinforcing between vehicle sidewalls, and wherein the frame supports each comprise a shaft and roller.

5. A motor vehicle having a seat assembly comprising a seat base and a seat back pivotally attached to the seat base, wherein the seat base comprises a seat frame spanning an interior width of the vehicle and including a frame support extending outwardly from each side of the seat frame, wherein each frame support engages a structural sidewall of the motor vehicle on a respective side of the seat base, and wherein the seat frame provides lateral structural reinforcement of the motor vehicle, and further comprising a track mounted to each structural sidewall of the motor vehicle, and wherein each frame support comprises two shafts extending outwardly from the side of the seat frame, and mounting a roller mechanism, and wherein the roller mechanism engages the track mounted to the respective structural sidewall for adjustable poisoning of the seat assembly.

6. The motor vehicle of claim 5, wherein each track further comprises an arcuate section for rotating and guiding the seat base into a non-horizontal position and into a storage position.

* * * * *